United States Patent [19]
Darwood

[11] 3,865,986
[45] Feb. 11, 1975

[54] VOICE OPERATED ELECTRIC CIRCUIT

[75] Inventor: James R. Darwood, Cerritos, Calif.

[73] Assignee: T.A.D. Avanti, Inc., Paramount, Calif.

[22] Filed: Oct. 3, 1973

[21] Appl. No.: 403,035

[52] U.S. Cl. .......................... 179/6 R, 179/100.1 VC
[51] Int. Cl. .......................... H04m 1/64
[58] Field of Search...79/6 R, 6 AC, 6 C, 100.1 VC; 340/148

[56] References Cited

UNITED STATES PATENTS

| | | | |
|---|---|---|---|
| 3,133,992 | 5/1964 | Dickman | 179/100.1 VC |
| 3,376,390 | 4/1968 | Hashimoto | 179/100.1 VC |
| 3,688,043 | 8/1972 | Konno | 179/100.1 VC |
| 3,688,126 | 8/1972 | Klein | 340/148 |
| 3,711,649 | 1/1973 | Ando | 179/100.1 VC |

*Primary Examiner*—Terrell W. Fears
*Assistant Examiner*—David K. Moore
*Attorney, Agent, or Firm*—Jessup & Beecher

[57] ABSTRACT

A voice operated circuit is provided which finds utility in a telephone answering system to permit the calling party to record a message of any length within the recording capabilities of the message tape of the answering system, in order that the calling party need not be limited to any predetermined message time interval. The voice operated circuit of the invention includes an integrating network which responds to incoming voice signals to produce an output whose amplitude varies on a time base so long as voice signals are received by the system. However, when the calling party hangs up, the resulting presence of silence, a tone signal, or a busy signal on the telephone line, causes the integrating network to produce an output of constant amplitude in the presence of the busy signal, and whose value is a function of the repetition frequency of the busy signal; and to produce an output of zero amplitude when no signal or when a constant frequency tone signal appears on the telephone line. The integrating network is followed by an output circuit which includes a differentiating network. The latter network produces a potential output of significant amplitude only when the output from the integrating network has a varying amplitude indicating that voice signals are being received, and whose output drops towards zero when the output from the integrating network is of constant amplitude or is of zero amplitude. The resulting output from the output circuit may be used to deactivate a telephone answering system when the amplitude of the output drops below a particular threshold level.

10 Claims, 4 Drawing Figures

PATENTED FEB 11 1975

3,865,986

SHEET 1 OF 3

VOICE OPERATED ELECTRIC CIRCUIT

BACKGROUND OF THE INVENTION

The telephone answering system which incorporates the voice operated circuit of the invention may be of the type which includes a sensing circuit that responds to a ring signal on the telephone line to activate the system. When the system is so activated, a recorded announcement is transmitted over the telephone line to the calling party during a time interval ($T_1$). A message recording tape is then activated in order that the calling party may record his message during a subsequent time interval ($T_2$). When the circuit of the invention is incorporated into such a telephone answering system, the message recording equipment is voice actuated, so that the calling party is not limited to any particular prescribed time interval ($T_2$) in which to record his message. Instead, as long as he continues talking, the message is recorded to the full capacity of the message tape.

Problems have existed in telephone answering systems of the voice actuated type, in that the prior art systems are generally incapable of handling the situation where the calling party hangs up, without recording any message. It often happens in such a situation, that the prior art telephone answering system, instead of deactivating itself, continues to run for the entire length of the recording internal without recording any useable information, and thereby wasting the entire unused portion of the message tape.

In order to solve the problem discussed in the preceding paragraph, telephone answering systems have been produced in the past which respond to voltage changes on the telephone line when the calling party hangs up, in order to deactivate the telephone answering system. Such a telephone answering system, for example, is described in Co-pending application Ser. No. 238,470, filed Mar. 27, 1972, which was refiled March 29, 1973 as application Ser. No. 364,729 and now U.S. Pat. No. 3,841,213. However, such telephone answering systems are not effective to deactivate themselves in the event the calling party hangs up during the announcement interval ($T_1$), when the system is not responding to incoming signals, but is transmitting the recorded announcement to the calling party.

Other systems have been devised in the prior art which respond, for example, to a silence or a tone signal on the telephone line, following a hang up by the calling party, to deactivate themselves automatically. However, many telephone systems produce a busy signal on the telephone line within a predetermined interval after the calling party has hung up. The situation can then arise where the calling party hangs up during the announcement interval ($T_1$) of a telephone answering system, for the system to encounter a busy signal when it switches itself into the message recording mode ($T_2$). Such prior art systems are incapable of distinguishing the received busy signal from normal voice signals and this results in the busy signal being recorded during the remaining length of the message recording tape, and thereby wasting the message tape.

A telephone answering system incorporating the circuit of the present invention is conditioned so that when the system enters into the message recording mode ($T_2$), at the end of the announcement interval ($T_1$), it will remain activated only if the calling party actually records a message. Should the calling party hang up at any time during the announcement interval ($T_1$), or during the message interval ($T_2$), so that a silence, a tone signal, or a busy signal occurs on the telephone line at the beginning or during the message interval ($T_2$), the system incorporating the circuit of the invention will automatically deactivate itself.

DETAILED DESCRIPTION OF THE ILLUSTRATED EMBODIMENT

Figure 1:
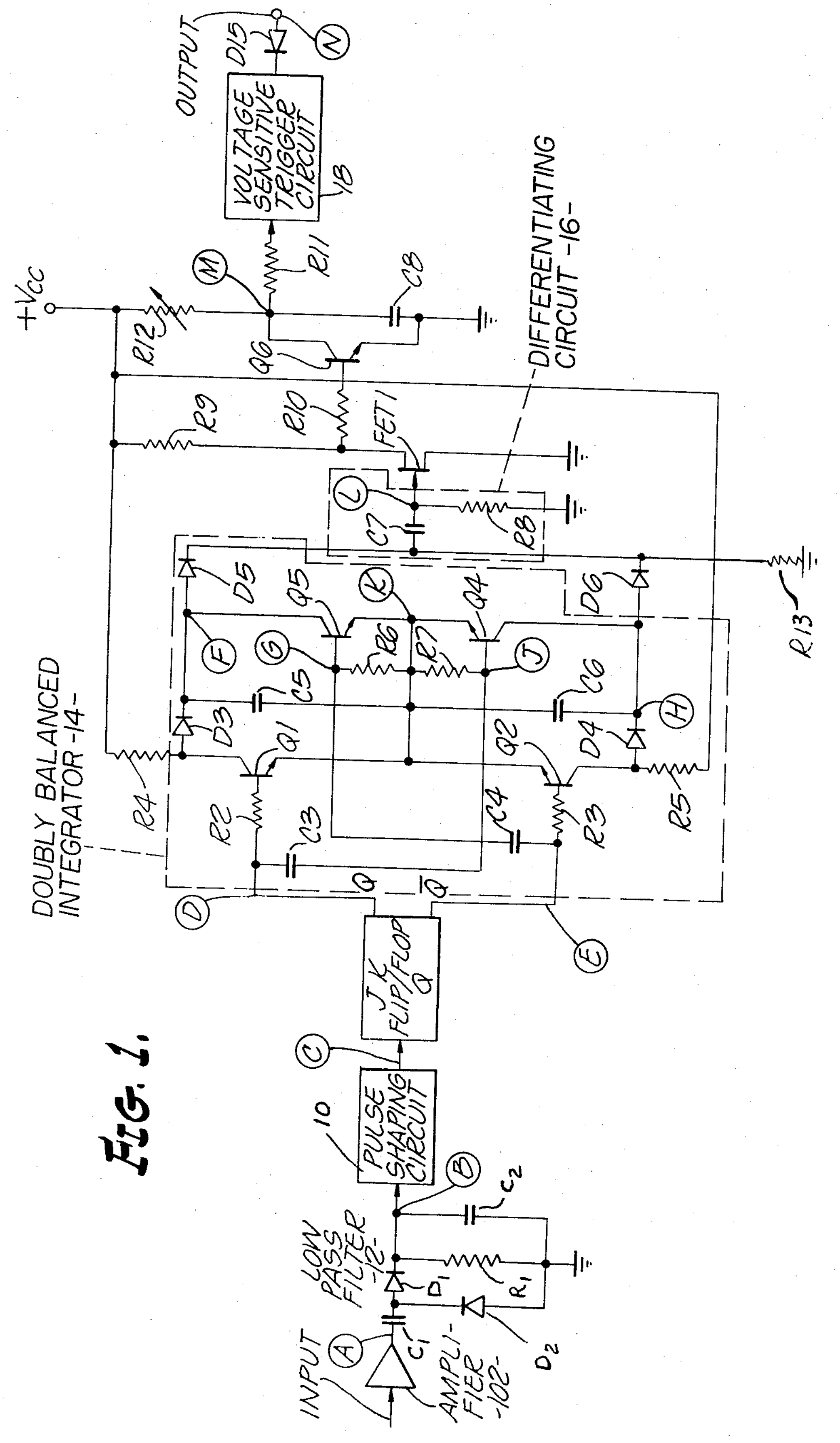
FIG. 1 is a circuit diagram, partly in block form and partly in circuit detail, of a voice actuated circuit incorporating the principles of the invention.

The voice actuated circuit shown in FIG. 1 may be incorporated into a telephone answering system, as explained above. When such is the case, the input to the amplifier 102 of FIG. 1 is a message received over the telephone line from the calling party when the system is responding to a call; or the input to the amplifier may be either a tone signal, a busy signal, or silence, should the calling party hang up.

The amplifier 102 is connected to a 2 microfarad capacitor C1 which, in turn, is connected to the anode of a diode D1 and to the cathode of a diode D2. The anode of the diode D2 is grounded, and the cathode of the diode D1 is connected to an appropriate pulse shaping circuit represented by the block 10, and to a grounded 6.8 ohm resistor R1, and also to a grounded 2 microfarad capacitor C2.

The circuit R1/C2 forms a low-pass filter 12 which, when the circuit is used in a telephone answering system, and with the circuit values set forth above, has a time constant of the order of 12.45 milliseconds, and passes signals below 80 cycles. This means that the low frequency components of the voice signals are passed by the low-pass filter to the pulse shaping circuit. However, the dial tone signal is attenuated by the low-pass filter, so that it does not reach the pulse shaping circuit. The bursts of the busy signal are passed by the low-pass circuit as a series of pulses of the repetition frequency of the busy signal bursts, although the frequency of the bursts themselves which, in most instances corresponds to the dial tone frequency, would not be passed the low-pass filter.

The pulse shaping circuit 10 is connected to a JK flip-flop Q which responds to the trailing edges of the pulses generated by the pulse shaping circuit 10 in response to the voice signals or to the busy signals. The JK flip-flop, as a result, generates pulses, the individual durations of which vary as the frequency of the input signals passed by the low-pass filter 12 varies.

The output terminal Q of the JK flip-flop is connected through a 1 kilo-ohm resistor R2 to the base of an NPN transitor Q1. The output terminal $\overline{Q}$ of the JK flip-flop, on the other hand, is connected through a 1 kilo-ohm resistor R3 to the base of an NPN transistor Q2. The emitters of the transistors Q1 and Q2 are grounded. The collector of the transistor Q1 is connected through a 22 kilo-ohm resistor R4 to a source of positive exciting potential +*Vcc*. The collector of the transistor Q2 is connected to the positive source through a 22 kilo-ohm resistor R5.

The output terminal Q of the JK flip-flop is also coupled through a .68 microfarad capacitor C3 to the base of an NPN transistor Q4, and the $\overline{Q}$ terminal of the flip-flop is coupled through a 0.68 microfarad capacitor C4 to the base of an NPN transistor Q5. The collector of the transistor Q1 is also connected to the anode of a diode D3, the cathode of which is connected to a grounded 4.7 microfarad capacitor C5 and to the collector of a transistor Q5. Likewise, the collector of the transistor Q2 is connected to the anode of a diode D4, whose cathode is connected to a grounded 4.7 microfarad capacitor C6 and to the collector of the NPN transistor Q4. The emitters of the transistors Q4 and Q5 are grounded, and their base electrodes are respectively connected to a pair of grounded 2.2 kilo-ohm resistors R6 and R7.

The collector of the transistor Q5 is connected to the anode of a diode D5, and the collector of the transistor Q4 is connected to the anode of a diode D6. The cathodes of the diodes D5 and D6 are both connected to a grounded 1 megohm resistor R13, and the cathodes are also coupled to the gate electrode of a field effect transistor FET1 through a 0.022 microfarad capacitor C7. The gate electrode of the transistor FET1 is connected to a grounded 1 megohm resistor R8. The source electrode of the transistor FET1 is grounded, and the drain electrode is connected to the junction of an 8.2 kilo-ohm resistor R9 and a 1.5 kilo-ohm resistor R10.

The circuit of the transistors Q1–Q5 forms a double balanced integrator 14, and the circuit of the capacitor C7 and resistor R8 forms a differentiating circuit 16. The output of the differentiating circuit is applied through the circuit of the field effect transistor FET1 to the base electrode of a grounded emitter NPN transistor Q6. The collector of the transistor Q6 is connected through a 25 kilo-ohm adjustable resistor R12 to the positive exciting potential source +V*cc*, and through a 2.2 kilo-ohm resistor R11 to the input of a voltage-sensitive trigger circuit 18. The collector of the transistor Q6 is also connected to a grounded 1000 microfarad capacitor C8. The output of the inverter is applied through a diode D15 to the output terminal of the circuit.

So long as voice signals are being received at the input terminal, the low-pass filter 12 passes signals through the pulse shaping circuit 10 to trigger the JK flip-flop Q. Since the voice signals passed by the low-pass filter 12 occur at irregular frequencies, the double balanced integrator 14 produces an output whose amplitude is variable. Changes in amplitude in the output from the integrator 14 are transformed into pulses by the differentiating circuit 16, and these pulses are passed by the circuit of the field effect transistor FET1 to cause the transistor Q6 repeatedly to become conductive repeatedly to discharge the capacitor C8 so as to prevent the capacitor C8 from assuming a charge above a predetermined threshold.

Now, should the calling party hang up and produce a silence on the telephone line, or a tone signal on the telephone line, the output from the low-pass filter 12 would drop to zero, so that the Jk flip-flop Q would no longer be triggered. This would cause the output from the double balanced integrator 14 and from the differentiating network 16 to drop to a level, such that the transistor Q6 is no longer pulsed to a conductive state. The capacitor C8 now may charge through the resistor R10. So long as the charge on the capacitor C8 remains below a preset threshold level, the output from the voltage-sensitive trigger circuit 18 remains high. However, when the charge across the capacitor C8 passes the preset threshold level, the output from the trigger circuit 18 goes low. Therefore, in the presence of silence on the telephone line, or of a tone signal, the capacitor C8 charges until it reaches the threshold, as set by the resistor R12, so as to trigger the circuit 18 and causes the output to be reduced to a low value.

By the same token, should the hang up of the calling party be followed by a busy tone on the telephone line, the double balanced integrator produces a unidirectional output having an amplitude proportional to the repetition frequency of the busy signal. Since this unidirectional signal has constant amplitude, the differentiating circuit 16 does not produce pulses, so that the transistor Q6 remains non-conductive, again permitting the capacitor C8 to charge so as to trigger the circuit 18.

The output of the trigger circuit 18 is connected to the control circuit of the telephone answering system, when the voice actuated circuit is incorporated into such a system, and it causes the control circuit to deactivate the telephone answering system whenever the output from the voice actuated circuit swings low.

The actual operation of the circuit of FIG. 1 response to voice signals may best be explained with reference to the curves of FIG. 2, and the operation of the circuit in response to a busy signal input may best be explained by reference to the curves of FIG. 3.

Figure 2:
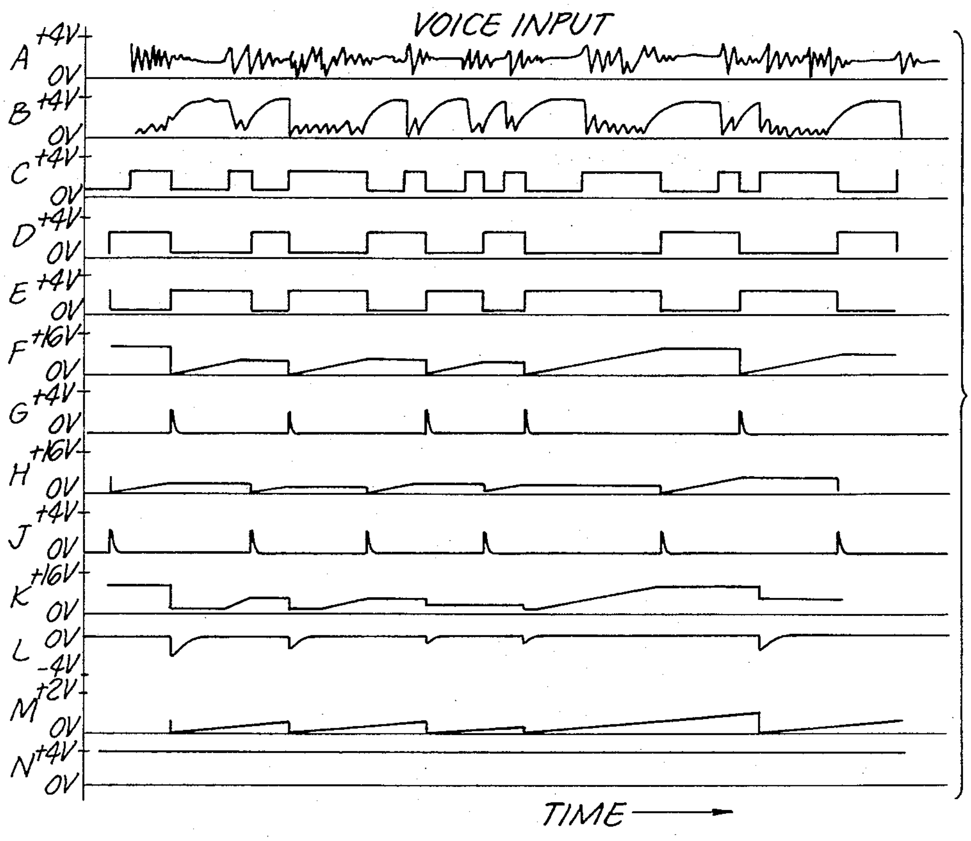
FIGS. 2 and 3 are curves useful in explaining the operation of the circuit of FIG. 1.

The curves of FIG. 2 show the operation of the system upon the receipt of voice signals. The voice signals appear in amplified form at the output of the amplifier 102, as shown by the curve A of FIG. 2. After the signals have passed through the low-pass filter 12 they assume the form shown in the curve B. The wave-form C then appears at the output of the pulse shaping circuit 10, and the Q output of the JK flip-flop is represented by the wave-form D, whereas the $\overline{Q}$ output is represented by the wave-form E.

Whenever the wave form D drops to its lower amplitude, the transistor Q1 becomes non-conductive, so that the capacitor C5 charges through the diode D3, as shown by the curve F. When the transistor Q1 is again rendered conductive as the wave-form D resumes its higher value, the capacitor C5 retains its charge due to the diode D3. However, for each positive going edge of the wave-form E the capacitor C5 is discharged as the transistor Q5 is rendered conductive by the pulses of the wave-form G. Therefore, the wave-form F assumes the illustrated configuration in FIG. 2.

In the same manner, the wave-form H representative of the voltage across the capacitor C6 assumes the wave-form shown in FIG. 2, as the capacitor C6 is discharged periodically by the pulses of the wave-form J corresponding to the positive going edges of the wave-form D. The wave-form K at the junction of the diodes D5 and D6 represents the larger of either of the wave-forms F and H, and it has a varying amplitude, as shown by the waveform K in FIG. 2, in the presence of voice signals.

The wave-form K is passed through the differentiating circuit 16, and the differentiating circuit produces the pulses of wave-form L to the field effect transistor FET 1. Each time a negative pulse in the wave-form L occurs, the field effect transistor FET 1 is biased non-conductive, rendering the transistor Q6 conductive to discharge the capacitor C8. Therefore, the charge on the capacitor C8 is never permitted to rise to a particular threshold level, since the capacitor is periodically discharged by the pulses of the wave-form L. Therefore, the voltage across the capacitor C8, as represented by the wave-form M, has a sawtooth configuration, and never rises to the predetermined threshold. For that condition, the voltage-sensitive trigger circuit 18 remains in its first stage in which the output N of the circuit remains high, as shown by the curve N of FIG. 2.

Therefore, in the presence of voice signals, the output from the circuit of FIG. 1 remains high. However, should the calling party hang up, so that the voice signals are replaced by either silence on the telephone line, or by a continuous tone signal, in either event, no signal is passed through the low-pass filter 12 to the pulse shaping circuit 10, so that the output from the integrator 14 drops to zero, and the transistor Q6 remains non-conductive, permitting the capacitor C8 to charge up to a threshold level which causes the trigger circuit 18 to be triggered to a second state at which the output N drops to deactivate the telephone answering system.

Figure 3:
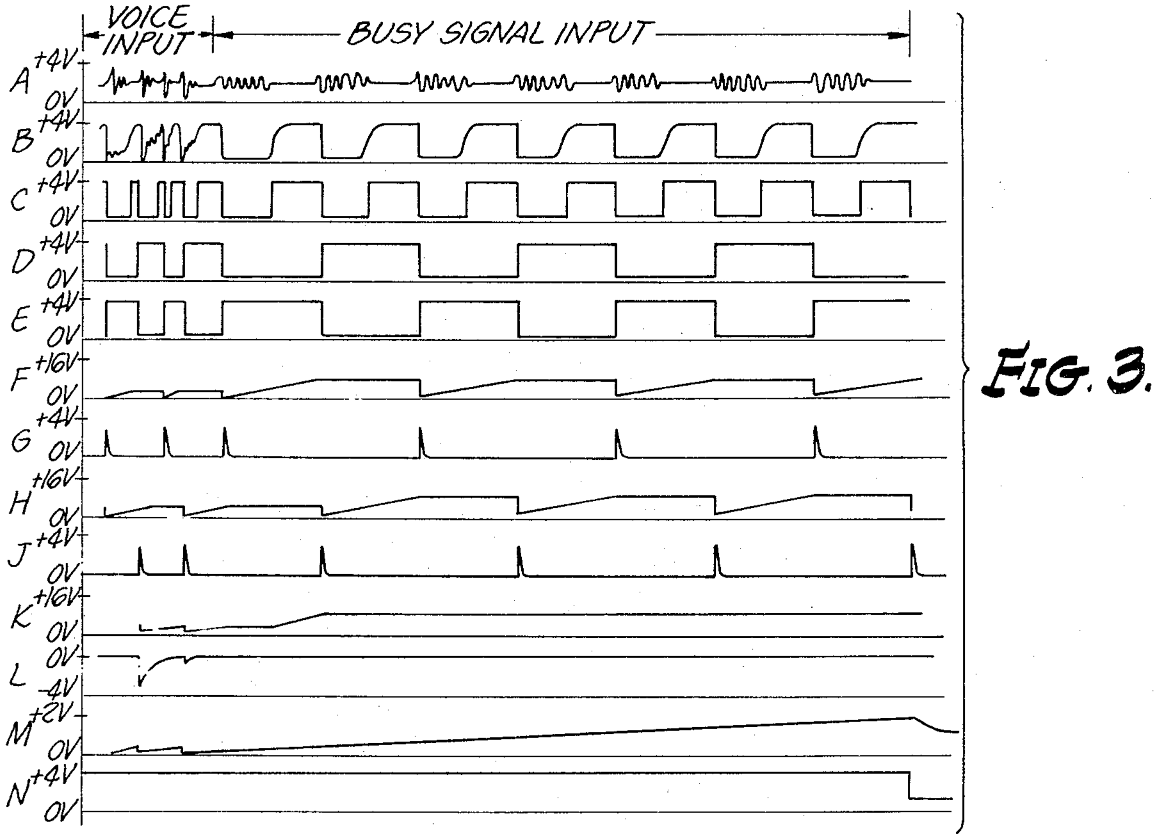

Likewise, for a busy signal input, and as shown by the curves of FIG. 3, the output K from the balanced integrator circuit rises to a constant amplitude, as shown by the curve K of FIG. 3, which amplitude corresponds to the repetition frequency of the busy signal input shown in the curve A of FIG. 3. Since the amplitude of the wave-form K is now constant, the wave-form L assumes a constant zero value, and does not incorporate any negative spikes. Therefore, the transistor Q6 remains non-conductive so that the voltage across the capacitor C8, as shown by the wave-form M rises to a point at which the voltage-sensitive trigger circuit 18 is triggered, so that the output N drops to its zero value, so as to deactivate the telephone answering system.

Figure 4:
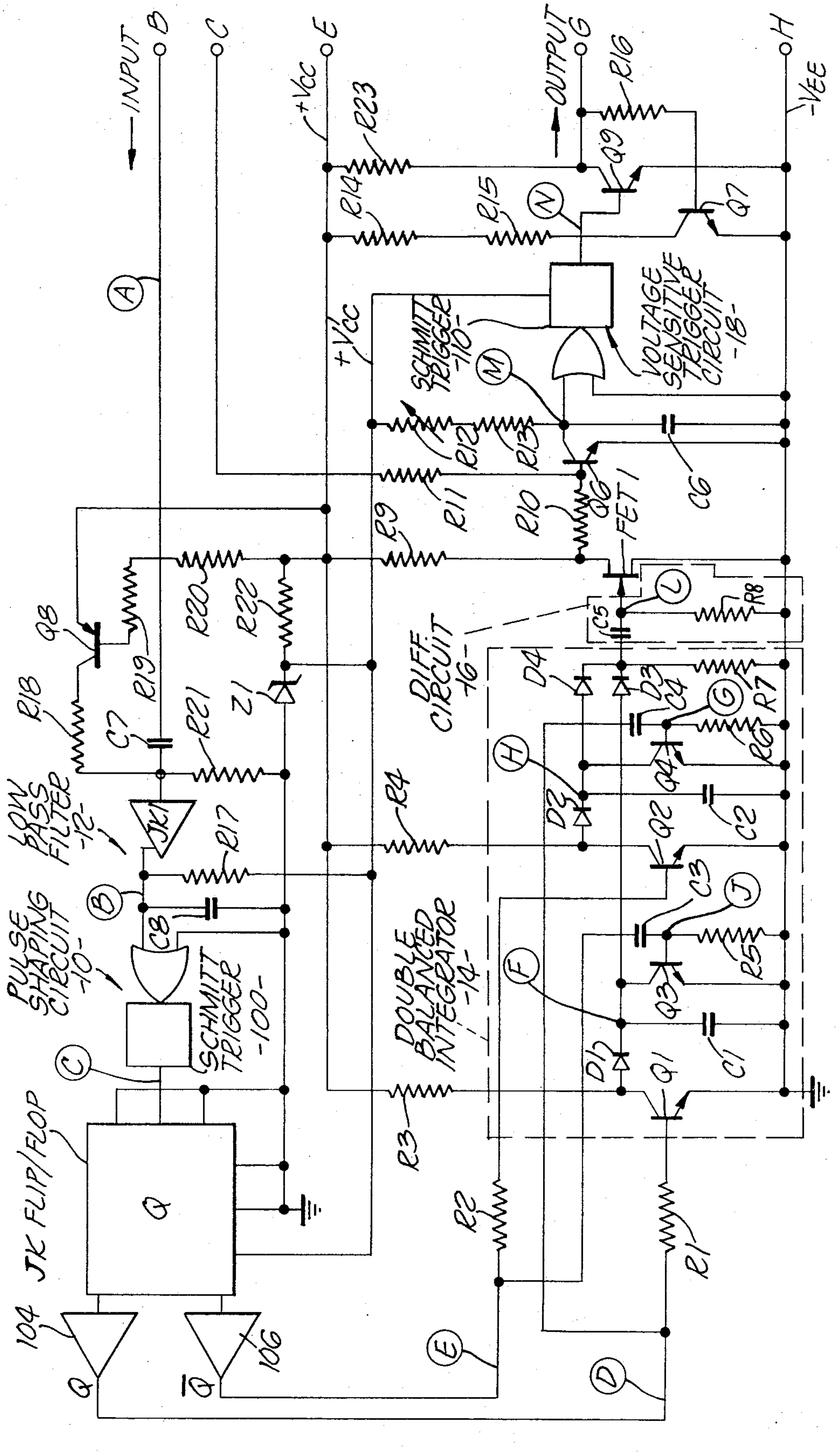
FIG. 4 is an actual printed circuit board diagram of a production embodiment of the system of the invention.

The circuit of FIG. 4 represents a production printed circuit embodiment of the system of the invention. For example, the input terminal A receives an input terminal B is used to receive an input from a telephone answering system. Likewise, a terminal G provides an output to the telephone answering system.

The circuit includes a 1 kilo-ohm resistor R20 and a 2.2 kilo-ohm resistor R19. The resistor R19 is connected to the base of a PNP transistor Q8, the emitter of which is connected to the terminal E. The terminal E is connected to the positive source $+V_{cc}$. The resistor R20 is connected to the $+V_{cc}$ source.

The input terminal B is connected to a coupling capacitor C7 which, in turn, is connected to the input of the expander section JK1 of the JK flip-flop Q. The collector of the transistor Q8 is connected through a 10 kilo-ohm resistor R18 to the same input, and the input is connected to ground through a 1 kilo-ohm resistor R21.

The output of JK1 is connected to a Schmitt trigger 100 which forms the pulse shaping circuit 10, and the output of the pulse shaping circuit 10 is connected to the JK flip-flop Q. The outputs from the JK flip-flop Q are passed through respective buffer amplifiers 104 and 106 to provide the inputs Q and $\overline{Q}$ to the double balanced integrator 14.

The signal Q is applied through a 2.2 kilo-ohm resistor R1 to the base of a transistor Q1, the emitter of which is grounded. The signal $\overline{Q}$ is applied through a 2.2 kilo-ohm resitor R2 to the base of a transistor Q2, whose emitter is grounded. The signal $\overline{Q}$ is also applied through a 1 microfarad capacitor C3 to the base of a transistor Q3. The capacitor C3 is connected to a grounded 2.2 kilo-ohm resistor R5. The emitter of the NPN transistor Q3 is grounded, and the collector is connected to a diode D3, and to a grounded 4.7 microfarad capacitor C1. The collector of the transistor Q3 is also connected through a diode D1 to the diode D3.

The signal Q is also applied to the base of a transistor Q4 through a 1 microfarad capacitor C4. The base of the NPN transistor Q4 is connected to a grounded 2.2 kilo-ohm resistor R6. The emitter of the transistor is grounded, and the collector is connected to a diode D4 and to a 4.7 microfarad grounded capacitor C2. The collector of the transistor Q2 is connected through a diode D2 to the diode D4. The cathodes of the diodes D3 and D4 are both connected to a 1 megohm grounded resistor R7 and to a 0.047 microfarad capacitor C5. The capacitor C5 is connected to a grounded 1 megohm resistor R8, and these elements form the differentiating circuit 16.

The differentiating circuit 16 is connected to the gate of the field effect transistor FET1, the source of which is grounded. The drain of the field effect transistor FET1 is connected through an 8.2 kilo-ohm resistor R9 to the positive terminal $+V_{cc}$, and through a 1,500 ohm resistor R10 to the base of a transistor Q6. The base of the transistor is also connected through an 8.2 kilo-ohm resistor R11 to a terminal C.

The collector of the transistor Q6 is also connected to a grounded 1,000 microfarad capacitor C6 and to a 6.8 kilo-ohm resistor R13. The resistor R13 is connected through a 25 kilo-ohm potentiometer R12 to a direct current exciting lead $+V'_{cc}$. This lead is connected through the resistor R22 to the $+V_{cc}$ lead and is also connected to a grounded Zener diode Z1. The transistor Q6, the capacitor C6, and the resistors R12 and R13 form the timing circuit 18. The emitter of the NPN transistor Q6 is grounded, and the collector is connected to the input of the voltage sensitive trigger circuit 18 which consists of a Schmitt trigger 110. The input to the Schmitt trigger 100 is also connected to a 1,500 ohm resistor R17 which, in turn, is connected to the lead $+V'_{cc}$. One of the terminals of the JK flip-flop Q is also connected to the lead $+V'_{cc}$, as is the Schmitt trigger 110 in the voltage sensitive circuit 18.

The output of the Schmitt trigger 110 is connected to the base of an NPN transistor Q9, the emitter of which is grounded. The ground lead is connected to a terminal H which, in turn, connects with the negative terminal $V_{ee}$ of a direct current voltage source. The collector of the transistor Q9 is connected to the $+V_{cc}$ lead through a 6.8 kilo-ohm resistor R23, and is connected to the output terminal G. The output terminal G is connected through a 2.2 kilo-ohm resistor R16 to the base of an NPN transistor Q7. The emitter of the transistor Q7 is grounded, and the collector is connected through a 4.7 kilo-ohm resistor R15 and through a 2.2 kilo-ohm resistor R14 to the $+V_{cc}$ lead.

In the circuit of FIG. 4, the low pass filter 12 is made up on the expander section JK1 of the JK flip-flop, together with a resistor R17, the capacitor C8, and the input section of the Schmitt trigger 100. When a positive pulse is received at the input of JK1, the expander is biased into its conductive state, and the capacitor C8 is discharged. When the input pulse is removed, or goes negative, the capacitor C8 begins to recharge through the resistor R17.

When the voltage across the capacitor C8 reaches approximately 1.4 volts, the Schmitt trigger 100 is tripped to its high state. The resistance-capacitance time constant of the circuit is approximately 10 milliseconds. If pulses are received at a higher rate, that is a frequency higher than 100 cycles per second, the capacitor C8 will remain substantially in its discharged state, so that any frequency greater than one hundred cycles per second is seen at the output of the Schmitt trigger 100 as a continuous negative pulse. For pulses, or series of pulses, which have a repetition rate less than one hundred cycles per second, the capacitor C8 will charge and discharge following the envelope of the input signal.

The pulse shaping circuit 10 is comprised entirely of the Schmitt trigger 100. This pulse shaping is necessary for properly driving the toggle input of the JK flip-flop Q. This toggle input must have a fall time greater than 10 nanoseconds and less than 100 nanoseconds. By using the regeneration inherent in the Schmitt trigger, and by using compatible logic device families, the necessary fall time may be achieved.

Interval determination is effectuated by means of the JK flip-flop Q. It is connected in the simple toggle mode with the set, clear and pre-clear inputs grounded. A negative transition at the toggle input causes the Q and $\overline{Q}$ flip-flop outputs to change state. That is, when the flip-flop output Q is high, the output $\overline{Q}$ is low, and vice versa. Each following negative transition of the toggle input causes the condition of the Q and $\overline{Q}$ outputs to reverse.

The double-balanced integrator 14 is made up of the transistors Q1, Q2, Q3 and Q4, the diodes D3 and D4, and associated resistors and capacitors. In operation, when the Q output of the JK flip-flop Q is low, the transistor Q1 is biased to its non-conductive state to permit the capacitor C1 to charge through the resistor R3 and diode D1. The time constant of the circuit R3/C1 is made large enough to be greater than the lowest anticipated repetition rate to which the circuit must respond. For example, when used in a telephone answering system this lowest rate is of the order of 1 cycle per second.

Thus, in operation at some time during which the capacitor C1 is charging, the Q and $\overline{Q}$ outputs of the JK flip-flop Q will reverse. When that occurs, the transistor Q1 is rendered conductive bringing its collector potential to a low value and terminating the charging action of the capacitor C1, since the diode D1 is now reverse biased. At this point in time, the capacitor C1 is in a "holding" state. The voltage to which the capacitor C1 was charged is totally dependent upon the time that the Q output of the JK flip-flop Q was low. This voltage, which represents time, will be referred to as V-1. At the time the capacitor C1 begins its "holding" action, the transistor Q2 is biased to its non-conductive state, thus allowing the capacitor C2 to begin its charging action.

When the Q and $\overline{Q}$ outputs of the JK flip-flop Q again reverse condition due to an input pulse, the capacitor C2 will begin its "holding" action. The voltage to which the capacitor C2 was allowed to charge is dependent upon the time which the Q output of the JK flip-flop Q was low. This voltage, which also represents time, will be referred to as V-2.

During the time that the capacitor C2 is holding, the transistor Q1 is again biased to its non-conductive state allowing the capacitor C1 to charge. Since this is the beginning of a new charge cycle for the capacitor C1, it must first be discharged. The necessary discharge action is accomplished by means of the circuit of the transistor Q3. At the same time that the Q output of the JK flip-flop Q goes low, rendering the transistor Q1 nonconductive, its complement output $\overline{Q}$ goes high. This positive transition at the $\overline{Q}$ output is differentiated by the circuit C3/R5, and the resulting pulse is used to bias the transistor Q3 to its non-conductive state for approximately 2 milliseconds, which is long enough to discharge completely the capacitor C1, and still does not constitute an appreciable portion of the anticipated repetition cycles. Likewise, when the capacitor C2 begins its charge cycle, the circuit of the transistor Q4 operates in a manner similar to the operation of the circuit of the transistor Q3, deriving its pulse from the Q output of the flip-flop and the differentiating network C4/R6.

Therefore, in continuous operation, the voltage level across the capacitors C1 and C2 is a measure of the time taken by alternate cycles of the repetition rate. If the input repetition rate is constant with respect to time, these two voltages V-1 and V-2 will be equal. If the input repetition rate is not constant with respect to time, such as occurs during the voice input, the voltages V-1 and V-2 will not be equal.

The diodes D3 and D4 are used to sample the voltages across the capacitor C1 and C2 simultaneously. The resultant voltage across the resistor R7 is the greater of the two voltages V-1 and V-2. If, for example, the voltage V-1 exceeds the voltage V-2, then the diode D3 will be forward biased while the diode D4 will be reverse biased, and therefore the voltage V-2 will be ignored. The resultant voltage across the resistor R7 is, therefore, a measure of input repetition rate. If the input repetition rate is constant, such as occurs in a telephone answering system for silence, steady tone, or busy tone on the telephone line, the voltage across the resistor R7 will remain constant since the voltage V-1 equals the voltage V-2 for each successive repetition cycle. When the input repetition rate is not constant, such as occurs during the voice input, the voltage across the resistor R7 will not remain constant since the voltage V-1 does not equal the voltage V-2 for each successive cycle.

The differentiating circuit 16 is composed of the capacitor C5, the resistor R8, and the field effect transistor FET1. In the quiescent state, the field effect transistor FET1 is biased to its conductive state, and the potential at its drain electrode is therefore low. During circuit operation, any change in potential across the resistor R7 is seen as a differentiated spike across the resistor R8. When the gate of the field effect transistor FET1 receives a negative-going spike, it is driven to its nonconductive state. Thus, abrupt negative-going potential changes across the resistor R7 appear as positive spikes at the drain electrode of the FET transistor. When the voltages V-1 and V-2 are equal for successive cycles, the potential at the drain electrode of the transistor FET1 will remain low. However, when the voltage V-1 does not equal the voltage V-2 for successive cycles, positive pulses will appear at the drain electrode of the transistor Q5.

The voltage sensitive trigger circuit 18 is composed of the transistor Q6, the capacitor C6, the resistor R13, the potentiometer R12, and the Schmitt trigger 110. The Schmitt trigger 110 is a 360° circuit, that is, when its input is low its output is low, and when its input is high its output is high. The "on" condition for the circuit is the output-low state. When positive pulses appear at the drain electrode of the field effect transistor FET1, these pulses are introduced to the base of the transistor Q6 through the resistor R10, and bias the transistor Q6 to its conductive state, causing the capacitor C6 to discharge.

The positive-going pulses at the drain of the field effect transistor FET1 bias the transistor Q6 to its conductive state, causing the capacitor C6 to discharge. When the capacitor C6 discharges, the input and output of the Schmitt trigger 110 is low. In the absence of positive-going pulses from the drain electrode of the transistor FET1, the capacitor C6 begins to charge through the resistor R13 and potentiometer R12. The potentiometer R12 is used to control the level at which the charge on the capacitor C6 will trigger the Schmitt trigger 110 to its high or "off" state.

The components of the timing circuit 20 are selected to have a time range of 3 seconds to 15 seconds. This means that depending upon the setting of the potentiometer R12, the timing circuit 20 will remain in the "on" state for a predetermined time following the last positive pulse received at the base of the transistor Q6. Therefore, as previously described, for any input repetition which is not constant with respect to time, such as voice signals, pulses will be received at the base of the transistor Q6 which will maintain the timing circuit 20 in its "on" state. However, when a voice signal is replaced by silence, a steady tone, or a repetitious signal, no further pulses will be received at the base of the transistor Q6, and the output of the timing circuit 20 will rise to a point at which the voltage sensitive trigger circuit will be switched to its "high" or "off" state after a predetermined time depending on the setting of the potentiometer R12.

Audio input from the of telephone answering system is received by way of the connector terminal B, and this input is applied directly through the coupling capacitor C7 to the input of the expander section JK1. Each positive pulse of audio signal received at this input causes the low pass filter 12 to be activated as previously described. Output control from the circuit of FIG. 4 for the telephone answering system is taken from the connector terminal G. The control circuit of the particular type of telephone answering system connected to the circuit of FIG. 4 requires a positive voltage for the "on" condition, and near zero voltage for the "off" condition. This requirement is the inverse of the available control from the Schmitt trigger 110, and the circuit of the transistor Q9 is used to invert the Schmitt trigger output so as to obtain the desired polarity.

A control input to the circuit of FIG. 4 from the telephone answering system is derived by way of the terminal C. This terminal is connected to a point in the telephone answering system which has positive voltage during the announcement mode ($T_1$) when the outgoing message is transmitted to the caller, and which has substantially zero voltage during the recording mode ($T_2$) when the telephone answering system is conditioned to record the message from the caller. During the announcement mode (T1) positive voltage received at the terminal C is fed to the base of the transistor Q6 by way of the resistor 11. This voltage biases the transistor Q6 to its conductive state for the duration of the announcement mode. This control prevents the voltage sensitive trigger circuit 18 from being triggered from its "off" state during the ($T_1$) announcement mode. When the announcement mode is terminated, and when the system enters the recording mode (T2), the bias is removed, and the transistor Q6 is free to respond to pulses received from the transistor Q5, as previously described, and to be triggered thereby to its "on" state. If no pulses are received from the transistor Q5 during the recording mode(T2), the voltage sensitive trigger circuit will revert to its "off" state after the predetermined time established by the circuit of capacitor C6.

The invention provides, therefore, an improved voice actuated circuit which is reliable and positive in its operation, and which assures that its output will drop in the presence of either silence, a dial tone, or a busy signal on the telephone line. The double integrator section of the circuit has wide utility as a frequency meter, in that it is capable of producing a unidirectional voltage output whose amplitude is directly proportional to the frequency of the input signal.

It will be appreciated that although a particular embodiment of the invention has been shown and described, modifications may be made. It is intended in the claims to cover the modifications which come within the spirit and scope of the invention.

What is claimed is:

1. A circuit for use in a telephone answering system, or the like, including: an input circuit for receiving signals in a particular frequency range; and a double-balanced integrator coupled to said input circuit for receiving a cyclic input signal and the complement of said cyclic input signal from said input circuit in response to the first-named signals, said integrator including first and second capacitors, a first transistor circuit connected to said input circuit and to said capacitors for introducing a charge to said first capacitor during a first portion of each cycle of the input signal received from said input circuit and for discharging said capacitor at the end of each cycle of such input signal, and a second transistor circuit connected to said input circuit and to said capacitors for introducing a charge to said second capacitor during a first portion of each cycle of the complement of such input signal received from said input circuit and for discharging said first capacitor at the end of each cycle of such complement signal.

2. The circuit defined in claim 1, in which said input circuit includes wave shaping circuit means to cause said input signal introduced to said integrator to have a rectangular wave shape.

3. The circuit defined in claim 2, in which said input circuit includes a low-pass filter to pass signals only below a particular frequency to said wave shaping circuit means.

4. The circuit defined in claim 1, and which includes an output circuit connected to said first and second capacitors for presenting an output signal representative of the larger of the voltages across said first and second capacitors.

5. The circuit defined in claim 4, and which includes differentiating circuit means included in said output circuit for producing pulses representative of changes in said output signal, and further circuit means responsive to said pulses for producing an output signal and for maintaining said output signal above a predetermined minimum threshold for the duration of the production of such pulses.

6. The combination defined in claim 1, and which includes low pass filter means interposed between the input circuit means and the integrator circuit means to attenuate the high frequency components of the voice signals and also to attenuate the dial tone signal to prevent such high frequency components and said dial tone signal from reaching the integrator means.

7. In a telephone answering system: input circuit means coupled to a telephone line for receiving from the telephone line, voice signals in a particular frequency range, a continuous dial tone signal of a particular frequency, and bursts of a busy signal of a particular repetition rate; a double-balanced integrator circuit means coupled to said input circuit means for producing a unidirectional potential output of changing amplitude in response to the voice signals, and for producing a unidirectional potential output of essentially constant amplitude in response to the busy signal bursts; differentiating circuit means coupled to the output of said integrator circuit means for producing pulses in response to amplitude changes in said unidirectional potential output produced by said integrator circuit means; and further circuit means coupled to the differentiating circuit means for producing an output signal having a first amplitude level in response to pulses from said differentiating circuit means and having a second amplitude level in the absence of pulses from said integrating circuit means.

8. The combination defined in claim 7, in which said further circuit means includes a voltage sensitive trigger circuit, and a control circuit interposed between said differentiating circuit means and said voltage sensitive trigger circuit for providing a trigger signal for said voltage sensitive trigger circuit from a first state to a second state in the absence of pulses from said differentiating circuit means over a predetermined time interval.

9. The combination defined in claim 7, and which includes wave shaping circuit means interposed between the input circuit and the integrator to cause the input signal introduced to the integrator to have a rectangular wave form, and flip-flop circuit means included in said wave shaping circuit means to introduce the rectangular input signal and its complement to the integrator circuit means.

10. The combination defined in claim 9, in which said double-balanced integrator means includes first and second capacitors, a first transistor circuit connected to the wave shaping circuit means and to said first capacitor for introducing a charge to said first capacitor during a first portion of each cycle of the input signal received from said wave shaping circuit means and for discharging said second capacitor at the end of each cycle of said input signal, and a second transistor circuit connected to said wave shaping circuit means and to said first and second capacitors for introducing a charge to said second capacitor during a first portion of each cycle of the complement of such input signal received from said wave shaping circuit means and for discharging said first capacitor at the end of each cycle of such complement signal; and an output circuit connected to said first and second capacitors for causing the unidirectional output to be representative of the larger of the voltages appearing across the first and second capacitors.

* * * * *